United States Patent [19]

Desor et al.

[11] Patent Number: 5,689,657

[45] Date of Patent: Nov. 18, 1997

[54] APPARATUS AND METHODS FOR BUS ARBITRATION IN A MULTIMASTER SYSTEM

[75] Inventors: Hans-Jurgen Desor, Denzlingen; Soenke Mehrgardt, March-Neuershausen, both of Germany

[73] Assignee: Deutsche ITT Industries GmbH, Freiburg, Germany

[21] Appl. No.: 599,444

[22] Filed: Jan. 18, 1996

Related U.S. Application Data

[63] Continuation-in-part of Ser. No. 166,141, Dec. 14, 1993, abandoned, which is a continuation of Ser. No. 853,673, Mar. 19, 1992, abandoned.

[30] Foreign Application Priority Data

Mar. 30, 1991 [EP] European Pat. Off. ............ 91105138

[51] Int. Cl.[6] ............................................. G06F 13/36
[52] U.S. Cl. .................... 395/299; 395/730; 395/287
[58] Field of Search ......................... 395/730, 299, 395/728, 287; 370/60

[56] References Cited

U.S. PATENT DOCUMENTS

| | | | |
|---|---|---|---|
| 4,257,095 | 3/1981 | Nadir | 395/299 |
| 4,320,467 | 3/1982 | Glass | 395/325 |
| 4,326,250 | 4/1982 | McCullough | 395/730 |
| 4,334,288 | 6/1982 | Booher | 395/325 |
| 4,458,314 | 7/1984 | Grimes | 395/325 |
| 4,467,418 | 8/1984 | Quinquis | 395/299 |
| 4,468,738 | 8/1984 | Hansen et al. | 395/325 |
| 4,470,110 | 9/1984 | Chiarottino et al. | 395/200.06 |
| 4,473,880 | 9/1984 | Budde et al. | 395/325 |
| 4,488,218 | 12/1984 | Grimes | 395/550 |
| 4,604,743 | 8/1986 | Alexandra | 370/85 |
| 4,608,700 | 8/1986 | Kirtley, Jr. et al. | 395/325 |
| 4,626,843 | 12/1986 | Szeto et al. | 340/825.5 |
| 4,760,515 | 7/1988 | Malmquist et al. | 395/325 |
| 4,789,926 | 12/1988 | Clarke | 395/325 |
| 4,791,562 | 12/1988 | Shima | 395/200 |
| 4,817,087 | 3/1989 | Yamada | 370/85 |
| 4,837,682 | 6/1989 | Culler | 395/325 |
| 5,088,024 | 2/1992 | Vernon et al. | 395/725 |
| 5,101,048 | 3/1992 | Kipnis | 395/325 |
| 5,119,292 | 6/1992 | Baker et al. | 395/725 |
| 5,123,105 | 6/1992 | Wyland et al. | 395/725 |
| 5,157,654 | 10/1992 | Cisneros | 370/60 |
| 5,175,731 | 12/1992 | Snarez | 370/85.6 |
| 5,230,041 | 7/1993 | Dinwiddie, Jr. et al. | 395/162 |
| 5,230,054 | 7/1993 | Tamura | 395/725 |
| 5,237,567 | 8/1993 | Nay et al. | 370/85.1 |
| 5,245,322 | 9/1993 | Dinwiddie, Jr. et al. | 345/115 |
| 5,261,047 | 11/1993 | Rishin | 395/163 |
| 5,434,590 | 7/1995 | Dinwiddie, Jr. et al. | 345/115 |

FOREIGN PATENT DOCUMENTS

| | | |
|---|---|---|
| 0139569 | 9/1984 | European Pat. Off. . |
| WO8700658 | 1/1987 | WIPO . |

*Primary Examiner*—Ayaz R. Sheikh
*Attorney, Agent, or Firm*—Plevy & Associates

[57] ABSTRACT

A bus arbitration method for a multimaster system comprising a plurality of masters sharing a global data bus and a plurality of bus arbiters sharing a global identification bus. Each active bus arbiter applies to the identification bus a bus request signal containing a k-bit-wide identification word representative of the priority of the master associated with the bus arbiter. In each prioritization step of the bus grant cycle, a logic level is produced on the identification bus by logically combining bits of equal significance. This logic level is then compared with the corresponding bits of the applied identification words. The k bits of the identification words of the bus arbiters are placed on the identification bus on a time-graded basis; in each prioritization step of the bus grant cycle, only those bits of the identification words are placed on the identification bus which are of equal significance, and in each prioritization step of the bus grant cycle, those bus arbiters whose identification word bit in the prioritization step does not match the logic level of the identification bus are eliminated from the bus arbitration of the bus gram cycle.

19 Claims, 5 Drawing Sheets

APPARATUS AND METHODS FOR BUS ARBITRATION IN A MULTIMASTER SYSTEM

This is a continuation of application Ser. No. 08/166,141, filed on Dec. 14, 1993, entitled APPARATUS AND METHODS FOR BUS ARBITRATION IN A MULTIMASTER SYSTEM, which is a Continuation of prior application Ser. No. 08/853,673, filed on Mar. 19, 1992, now abandoned.

FIELD OF THE INVENTION

This invention relates to bus arbitration in a multimaster system and more particularly, to bus arbitration employing time graded prioritization steps for determining the priority among competing masters seeking to access to a data bus.

BACKGROUND OF THE INVENTION

Many computer and other electronic systems utilize data buses to enable the transfer of data between components of the system or with other systems. Essentially, such data buses are shared by the system components, resulting in limited access to the data buses. In general, this occurs since such access must be temporarily reallocated among competing components or systems seeking to use a data bus. Access to the data bus becomes further restricted when more elements are added that seek to use the data bus. A method utilized by the prior art in such situations employs arbitration techniques. Arbitration techniques essentially arbitrate among the competing demands of the components or systems seeking to utilize a data bus. Such arbitration techniques generally result in prioritized access to the data bus among the system components. In this regard, reference is made to U.S. Pat. No. 4,468,738 entitled BUS ACCESS ARBITRATION USING UNITARY ARITHMETIC RESOLUTION LOGIC AND UNIQUE LOGICAL ADDRESSES OF COMPETING PROCESSORS which issued to Hansen et al on Aug. 28, 1984. This patent describes a composite address resolution scheme that utilizes parallel processors that are connected together via a multi-processor bus. Resolution is based on a composite logical address wherein the bus is awarded to the processor with the lowest composite logical address. In addition, reference is also made to U.S. Pat. No. 4,334,288 entitled PRIORITY DETERMINING NETWORK HAVING USER ARBITRATION CIRCUITS COUPLED TO A MULTILINE BUS circuit that enables software programmable priority numbers to be assigned to users of a system.

One prior art arbitration technique utilizes an iterative process that is part of a bus grant cycle. The iterative process includes a series of prioritization steps that determines the priority of access to a data bus among a plurality of masters in a multimaster system. The plurality of masters share a global data bus. Each master has associated with it a bus arbiter, with all the bus arbiters sharing a global identification bus. The bus arbiters in such prior art systems are generally configured such that a logic level of "0" prevails over a logic level of "1". In a first prioritization step of the bus grant cycle, each bus arbiter involved in the bus arbitration applies a bus request signal to the identification bus. Each bus request signal includes an identification word indicating the priority of the master associated with the bus arbiter. The identification word is comprised of a predetermined number of bits, the predetermined number herein referred to as "k". Each bit of each identification word is then designated as having a relative significance level ranging from most significant to least significant bit. In addition, the identification bus includes k logic lines, with each line representing one bit of the identification word and the set of logic lines representing the identification word. Each bus arbiter transmits all k bits of its identification word to the k logic lines of the identification bus. A logic operation is then performed on all bits of the identification word according to their relative significance levels. This results in k parallel logic levels being formed on the identification bus. The k logic levels are subsequently read back by the bus arbiters of the multimaster system. Each logic level of the identification bus is then successively compared with the corresponding bits of the identification word. Consequently, each bus arbiter then replaces all lower order 1 bits of the identification word with 0 bits. In a second prioritization step of the bus grant cycle, the modified identification words obtained from the first prioritization step are transferred to the identification bus instead of the original identification words. The modified identification words are then processed in a manner similar to the first prioritization step. This iterative process is continued until k logic levels are present on the identification bus that match the k bits of one of the original identification words of an active bus arbiter. This bus arbiter then produces a grant signal which indicates to its associated master that it may take control of the global data bus. In such prior art systems, the prioritization time is equal to the time required to cycle through the necessary k prioritization steps of the bus grant signal.

This type of arbitration technique has a number of disadvantages. One disadvantage concerns hardware implementation of the multimaster system. In order to perform the previously described bus arbitration, each prioritization step generally requires that all k bits of each identification word be placed in parallel on the identification bus. The number of logic lines necessary for such an identification bus increases the complexity of the structure of the multimaster system. In addition, the complexity of the wiring of the bus arbiters is increased since they must be connected to the identification bus by bus-arbiter connections which also have k logic lines. Moreover, the problem is exacerbated if the identification bus is to be utilized as part of an integrated circuit.

In such prior art arbitration techniques, the prioritization time required for a bus grant cycle is generally equal to the time required to perform the necessary prioritization steps of a bus gram cycle. However, the required parallel processing all k bits of the identification words in each prioritization step does not generally permit the simultaneous performance of several successive bus grant cycles. This results in a slow operating speed of the multimaster system since a prioritization time required for a bus grant cycle elapses between every two successive allocations of the global data bus. It would be advantageous to reduce the complexity of such prior art systems by reducing the number of logic lines. In addition, it would be advantageous to be able to perform the simultaneous arbitration of several successive bus grant cycles in order to provide a faster operating speed.

SUMMARY OF THE INVENTION

An apparatus for bus arbitration comprising a data bus, an identification bus, a plurality of masters coupled to said data bus wherein each of said plurality of masters has a predetermined priority for access to said data bus, identification word generating means for generating identification words indicative of said predetermined priority wherein each of said identification words include a plurality of bits, time graded transmission means coupled to said identification word generating means and said identification bus for providing a plurality of time graded transmissions of equally significant bits of said identification words to said identification bus, logic level forming means coupled to said identification bus for forming a logic level on said identification bus by logically combining said equally significant bits of each of said plurality of time graded transmissions and bus granting means coupled to said data bus and to said identification bus for granting access to said data bus to one of said plurality of masters having corresponding bits that match each of said logic levels formed on said identification bus during said time graded transmissions of equally significant bits.

DETAILED DESCRIPTION OF THE INVENTION

Figure 1:
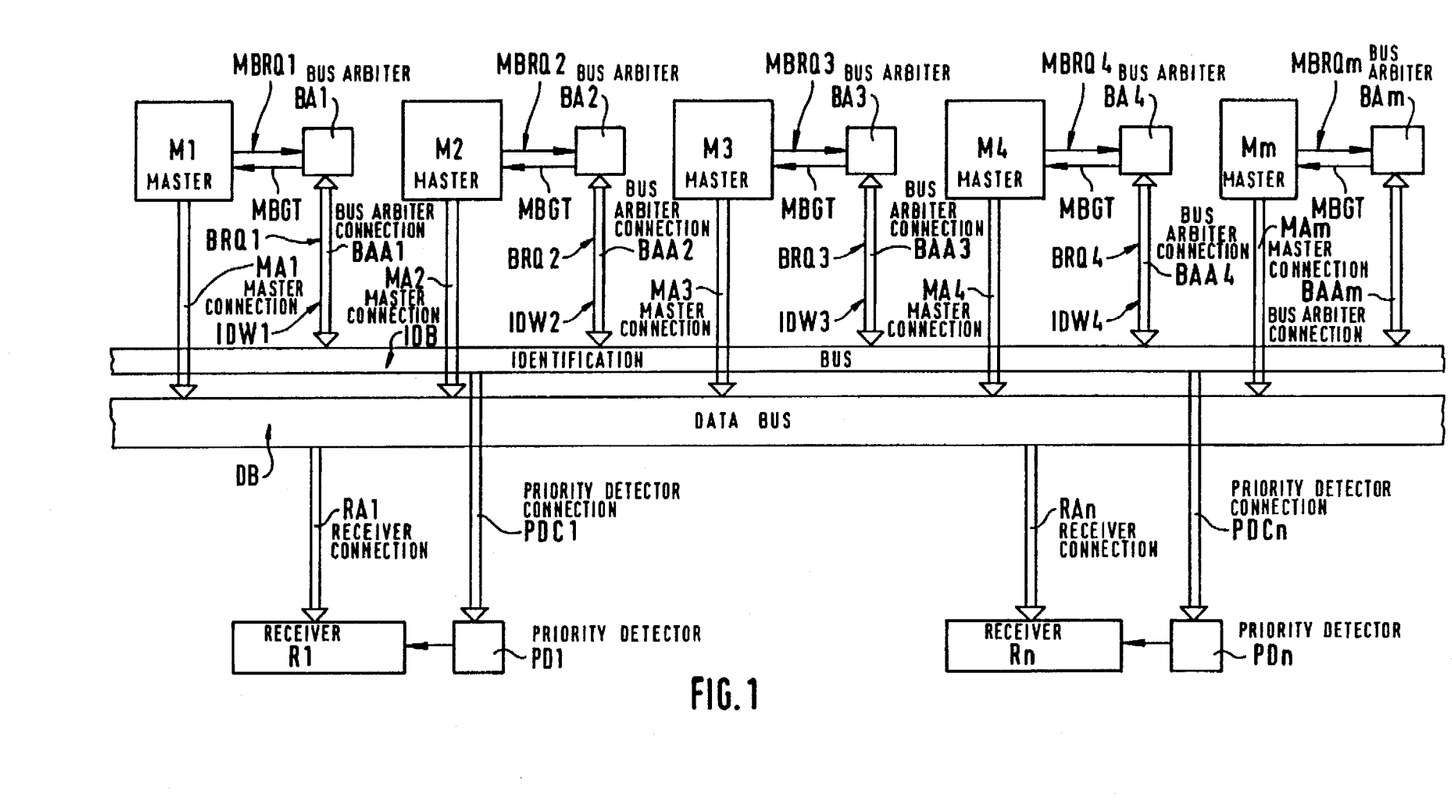
FIG. 1 is a diagram of a multimaster system in accordance with the present invention.

Referring to FIG. 1, a diagram of a multimaster system in accordance with the present invention is shown. The multimaster system is comprised of a plurality of masters M1–Mm, each of which are connected to a common data bus DB by unidirectional master connections MA1–MAm. Each of the masters M1–Mm has associated with it corresponding bus arbiters BA1–BAm. In addition, each of the bus arbiters BA1–BAm are connected to an identification bus IDB by bidirectional bus arbiter connections BAA1–BAAm. A plurality of receivers R1–Rn are also connected to the data bus DB, each of the receivers R1–Rn being connected by unidirectional receiver connections RA1–RAn. Moreover, associated with each receiver R1–Rn are priority detectors PD1–PDn. Each priority detector PD1–PDn is connected to the identification bus IDB by priority detector connections PDC1–PDCn. It is understood that master connections MA1–MAm, receiver connections PA1–RAn and priority detector connections PDC1–PDCn may also be bidirectional. By way of example, if master M1 desires to access the data bus DB, master M1 signals this bus request to its bus arbiter BA1 by generating a master bus request signal MBRQ1. The bus arbiter BA1 then sends a bus request signal BRQ1 to the identification bus IDB. The bus request signal BRQ1 includes an identification word IDW1 which indicates the priority assigned to the master M1. If two or more bus arbiters apply their request signals to the identification bus IDB simultaneously during a bus grant cycle, bus arbitration is necessary. Such bus arbitration will be explained hereinafter. The bus arbiter BA1 associated with the master M1 then provides a master bus grant signal MBGT to master M1. Consequently, master M1 takes control of the data bus DB and carries out its data transfer. The priority detector PD receives and evaluates the identification word of the prioritized master M from the identification bus IDB. Essentially, the priority detector PD decides whether the data placed on the data bus DB by the prioritized master M will be accessed by its corresponding receiver R or whether the data is to be ignored by the receiver R.

Figure 2:
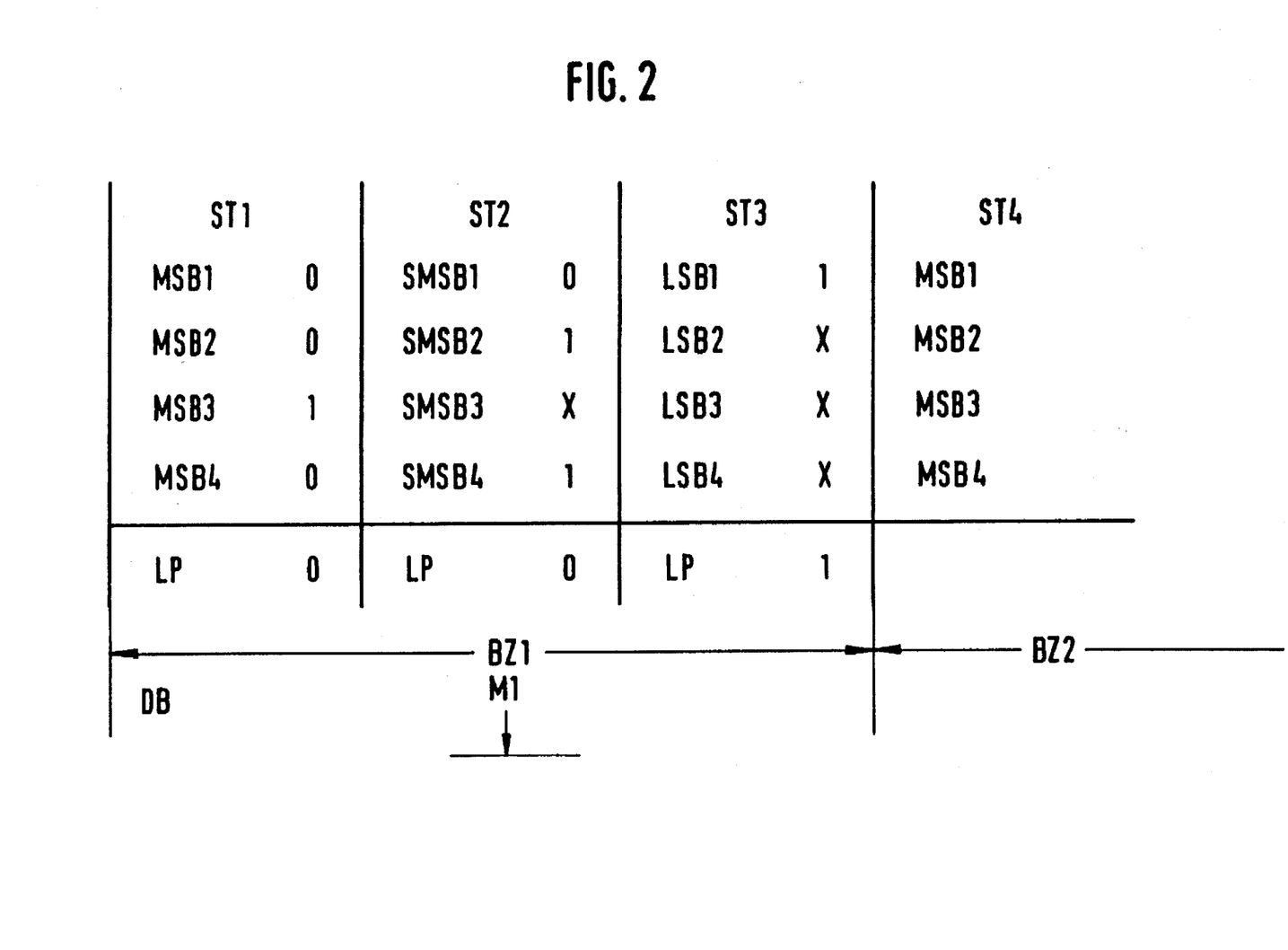
FIG. 2 is a table illustrating iterative prioritization steps of a bus grant cycle utilized.

A first embodiment of bus arbitration in accordance with the present invention will now be described by FIG. 2 in conjunction with FIG. 1. FIG. 2 is a table representing the iterative prioritization steps of a bus grant cycle BZ1. Each prioritization step takes place during a period of a system clock that controls signal processing operations. In this technique, bits of equal significance of an identification word are transmitted on a time graded basis, thus reducing the complexity of the identification bus. By way of example, it will be assumed that four masters, M1, M2, M3 and M4, are assigned corresponding priorities 1, 2, 6 and 3. It is understood, however, that any of a plurality of masters may be employed and that the four used as examples here are not limitations of the present invention. In order to access a common data bus DB, masters M1, M2, M3 and M4 send master bus request signals MBRQ1, MBRQ2, MBRQ3 and MBRQ4 to their respective bus arbiters BA1, BA2, BA3 and BA4. The bus arbiters BA1, BA2, BA3 and BA4 then send corresponding bus request signals BRQ1, BRQ2, BRQ3 and BRQ4. The bus request signals BRQ1, BRQ2, BRQ3 and BRQ4 include identification words IDW1, IDW2, IDW3, IDW4 that represent the priority of the associated masters. The identification words are comprised of a predetermined number of bits, the predetermined number herein referred to as "k". In this example, the identification words IDW1, IDW2, IDW3, IDW4 utilize a 3 bit binary coded number to represent the priorities. Therefore, the 1, 2, 6 and 3 priorities of masters M1, M2, M3 and M4 are represented as 001, 010, 110 and 011. In addition, each identification word IDW1, IDW2 IDW3 and IDW4 is designated as having most significant bits MSB1, MSB2, MSB3 and MSB4, next most significant bits SMSB1, SMSB2, SMSB3 and SMSB4 and least significant bits LSB1, LSB2, LSB3 and LSB4. As will be explained in the description of FIG. 4, the first embodiment employs an identification bus IDB having one logic line LP. Furthermore, bus arbiters BA1, BA2, BA3 and BA4 are interconnected in a logical "AND" configuration such that the logic level "0" prevails over logic "1". Consequently, priority is assigned to the master which has the lowest priority. However, it is understood that the arbitration technique of the present invention can be modified so that priority is assigned to the master which has the highest priority. A method of modifying the priority includes interconnecting the bus arbiters in a logical "OR" configuration such that the logic level "1" prevails over logic level "0".

Figure 3:
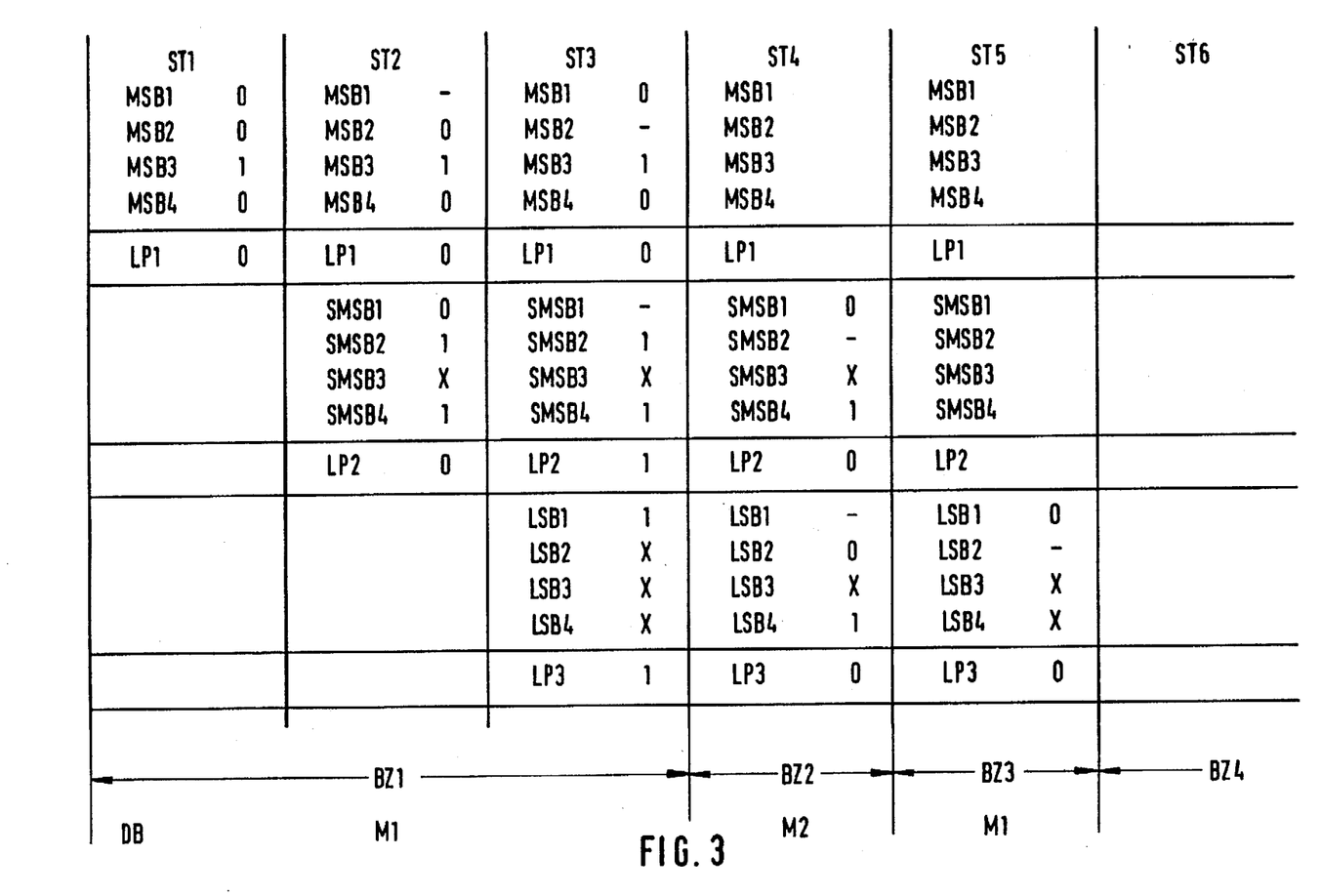
FIG. 3 is a table illustrating iterative prioritization steps that are performed simultaneously.

Referring to FIG. 2, a first prioritization step of the first bus grant BZ1 occurs during a first period ST1 of the system clock. In this step the bus arbiters BA1, BA2, BA3 and BA4 apply most significant bits MSB1, MSB2, MSB3 and MSB4 to the identification bus IDB. A logic level of "0" is formed on logic line LP due to the AND logical function of bus arbiters BA1, BA2, BA3 and BA4. Each bus arbiter BA1, BA2, BA3 and BA4 then compares the logic level of the identification bus IDB with the most significant bits MSB1, MSB2, MSB3 and MSB4. If the most significant bits MSB1, MSB2, MSB3 and MSB4 do not correspond to the "O" logic level of the logic line LP, the respective bus arbiter will be disabled. Consequently, it will not take part in the following prioritization steps of the first bus grant cycle BZ1. As can be seen, the most significant bit MSB3 of the identification word IDW3 does not correspond to the "O" logic level of logic line LP. Accordingly, bus arbiter BA3 and, consequently, master M3 will not take part in the second prioritization step of the first bus grant cycle BZ1. This situation is indicated in FIG. 3 by an "X".

A second prioritization step occurs during the second system clock period ST2. In this step, only the remaining bus arbiters, i.e. BA1, BA2 and BA4, place the next most significant bits SMSB1, SMSB2 and SMSB4 on the identification bus IDB. In addition, the identification bus IDB again forms a 0 logic level on logic line LP due to the AND logical function of the remaining bus arbiters. As can be seen, the next most significant bits SMSB2 and SMSB4 do not correspond to the "0" logic level. Consequently, bus arbiters BA2 and BA4 are disabled and masters M2 and M4 drop out of the bus arbitration of the first bus grant cycle BZ1.

In a third prioritization step occurring during the third system clock period ST3, only remaining bus arbiter BA1 is involved in the bus arbitration. Bus arbiter BA1 places the least significant bit LSB1 of the first identification word IDW1 on the identification bus IDB. Since masters M2, M3 and M4 have already dropped out of bus arbitration, the identification bus IDB forms a logic level "1" on logic line LP due to the AND logical function. Since this logic level corresponds to the binary value of the least significant bit LSB1, bus arbiter BA1 generates a bus grant signal MBGT which is sent to the master M1. Consequently, master M1 takes control of the data bus DB.

The bus arbitration method explained in the first embodiment may now be generalized for the case of a k bit identification word IDW. In such a situation, k prioritization steps are utilized. In the first of the k prioritization steps of the first bus grant cycle BZ1, the most significant bits MSB of the identification words IDW of the bus arbiters BA involved in bus grant cycle BZ1 are placed on the identification bus IDB. By comparing the most significant bits MSB of the identification words IDW with the logic level formed on the logic line of the identification bus IDB, all bus arbiters BA whose most significant bit MSB does not correspond to the logic level are disabled and thus eliminated from the first bus grant cycle BZ1. In subsequent "k-1" prioritization steps, the procedure is analogous to that in the first prioritization step, but instead of the most significant bits MSB, the next most significant bits of the identification words IDW of the remaining bus arbiters BA are applied to the identification bus IDB. As can be seen, the last, i.e. "kth" prioritization step results in a maximum of two bus arbiters remaining with corresponding least significant bits LSB placed on the identification bus IDB. A logic level is again formed on the identification bus IDB and the bus arbiter whose least significant bit LSB corresponds to the logic level provides the grant signal MBGT to its corresponding master.

As can be seen, the k bits of the identification words are transmitted on a time graded basis wherein in each prioritization step only those identification words which are of equal significance are placed on the identification bus. Consequently, an identification bus IDB can be utilized that is comprised of a single logic line. Essentially, this results in reduced complexity of associated hardware since not all k bits of each identification word have to be placed in parallel on the identification bus. Moreover, the prioritization time required for bus arbitration, as in the prior art, is k periods ST1-STk of the system clock. Consequently, although the complexity of the identification bus is reduced, the prioritization time required for bus arbitration is not increased over the prior art.

FIG. 3 is a table representing a preferred embodiment that utilizes overlapping bus grant cycles which reduce the operating time of the arbitration system. By way of example, it will be assumed that in the first bus grant cycle BZ1 masters M1, M2, M3 and M4 seek to access the common data bus DB. In a second bus grant cycle BZ2, the masters M2, M3 and M4 also seek to access data bus DB. Moreover, in a third bus grant cycle BZ3, the masters M1, M2 and M3 seek to access data bus DB. In addition a 3 bit identification word will be utilized in conjunction with an identification bus having first LP1, second LP2 and third LP3 logic lines, as will be explained in the description of FIG. 4. In a first prioritization step of the first bus grant cycle BZ1, which occurs during a first system clock period ST1, the most significant bits MSB1-MSB4 of identification words IDW1-IDW4 are placed on the first logic line LP1. As previously described, a logic level of 0 is formed on the first logic line LP1 of the identification bus IDB due to the interconnection of the bus arbiters in the AND logical function configuration. Each bus arbiter BA1-BA4 then compares the logic level of the first logic line LP1 with the most significant bits MSB1-MSB4. If the most significant bits MSB1-MSB4 do not correspond with the logic level of the first logic line LP1, the respective bus arbiter is disabled. Consequently, bus arbiter BA3 and its associated master M3 will not take part in the second prioritization step of the first bus grant cycle BZ1. This situation is indicated in FIG. 3 by an X.

A second prioritization step of the first bus grant cycle BZ1 occurs during a second system clock period ST2. In this second step, the next most significant bits SMSB1, SMSB2 and SMSb4 are placed on the second logic line LP2. Consequently, the second logic line LP2 forms a 0 logic level in accordance with the previously described AND logic operation. Consequently, bus arbiters BA2 and BA4 are disabled and their associated masters M2 and M4 drop out of the first bus grant cycle BZ1.

Simultaneously with the processing of the next most significant bits SMSB1-SMSB4, the first prioritization step of a second bus grant cycle BZ2 is performed. Bus arbiters BA2, BA3 and BA4 place the most significant bits MSB2-MSB4 of identification words IDW2-IDW4 on the first logic line LP1. Logic level 0 is now formed on logic line LP1 in accordance with the previously described AND logic operation. Consequently, master M3 drops out of the bus arbitration of the second bus grant cycle BZ2.

A third prioritization step of the first bus grant cycle BZ1 occurs during a third system clock period ST3. In this third step, the bus arbiter BA1 places the least significant bit LSB1 of the first identification word IDW1 on the third logic line LP3. As can be seen, logic level 1 is now formed on logic line LP3 in accordance with the AND logic operation. Consequently, the bus arbiter BA1 and its associated master M1 is granted control of data bus DB at the end of the third system clock period ST3.

Simultaneously with the third prioritization step of the first bus grant cycle BZ1, the second prioritization step of the second bus grant cycle BZ2 is performed. In this step, bus arbiters BA2 and BA4 place the next most significant bits SMSB2 and SMSB4 onto the second logic line LP2 of the identification bus IDB. Logic level 1 is now formed on logic line LP2 in the manner previously described. However, neither of masters M2 and M4 drop out in this prioritization step since the logic level formed on logic line LP2, i.e. 1, corresponds to both next most significant bits SMSB2 and SMSB4.

In conjunction with the third prioritization step of the first bus grant cycle BZ1 and the second prioritization step of the second bus grant cycle BZ2, a first prioritization step of the third bus grant cycle BZ3 is performed. In this step, bus arbiters BA1, BA2 and BA3 place the most significant bits MSB1, MSB2 and MSB3 on the first logic line LP1 of the identification bus IDB. The logic level formed on logic line LP1 is now 0. This causes bus arbiter BA3 to be disabled, causing its master M3 to drop out of the bus arbitration of the third bus grant cycle BZ3.

In the fourth system clock period ST4, a second prioritization step of the third bus grant cycle BZ3 is performed. In this step, bus arbiters BA1 and BA4 place the next most significant bits SMSB1 and SMSB4 onto the second logic line LP2 of the identification bus IDB. Logic level 0 is now formed on the second logic line LP2 in the manner previously described. This causes bus arbiter BA4 to be disabled, causing its master M4 to drop out of the bus arbitration of the third bus grant cycle BZ3.

In conjunction with the preceding second prioritization step, a third prioritization step of the second bus cycle BZ2 is performed. In this step, bus arbiters BA2 and BA4 place the least significant bits LSB2 and LSB4 onto the third logic line LP3 of the identification bus IDB. Since the logic level of the third logic line LP3 is now 0, it can be seen that bus arbiter BA4 and associated master M4 drop out. Consequently, the remaining master, M2, takes control of the common data bus DB. In addition, a first prioritization step of the fourth bus grant cycle BZ4 is performed in conjunction with the previous two prioritization steps. The signal processing performed in this step is apparent from the previous descriptions of the first ST1, second ST2 and third ST3 clock periods and need not be described here.

Moreover, in a fifth system clock ST5, a second prioritization step of the fourth bus grant cycle BZ4 (not shown) and a first prioritization of a fifth bus grant cycle BZ5 (not shown) are performed simultaneously with a third prioritization step of the third bus grant cycle BZ3. In this step, it can be seen that master M1 takes control of the data bus DB. As can be seen, the preferred embodiment reduces the prioritization time required for bus arbitration.

The preferred embodiment of the bus arbitration system described in FIG. 3 is especially suited to be utilized in a video system. In a video system such as a digital TV, the screen is capable of being divided into different configurations in order to show multiple video images. The screen is divided into groups of pixels, wherein each group of pixels is capable of generating a different video image from video data received from a separate video source. Such a video system is capable of changing the video image shown by one or more group of pixels by switching the video receivers sending video data. The switching out of the video sources is accomplished at a rate of 40 MHz in order to be compatible with the rate of speed in which video data is sent to the screen of the video system.

The preferred embodiment of the bus arbitration system as described in FIG. 3 is readily configured as a video system described above. In such a configuration, all of the elements as previously described in FIG. 3 operate and function the same. The only difference is that the plurality of masters M1-Mm are embodied as a plurality of video sources, while the plurality of receivers R1-Rn are embodied by a plurality of video sources. The bus arbitration system would operate as described in FIG. 3 to grant access to the different video sources based on the predetermined priority of each of the video sources. The overlapping bus grant cycles of the present invention as described in FIG. 3 enable the video sources to be switched out at a rate that is compatible with the rate in which video data is sent to the video screen. In fact, the speed of the overlapping bus grant cycles enables priority to be given to a particular video source even before the video data is available to be sent over the data bus.

Figure 4:
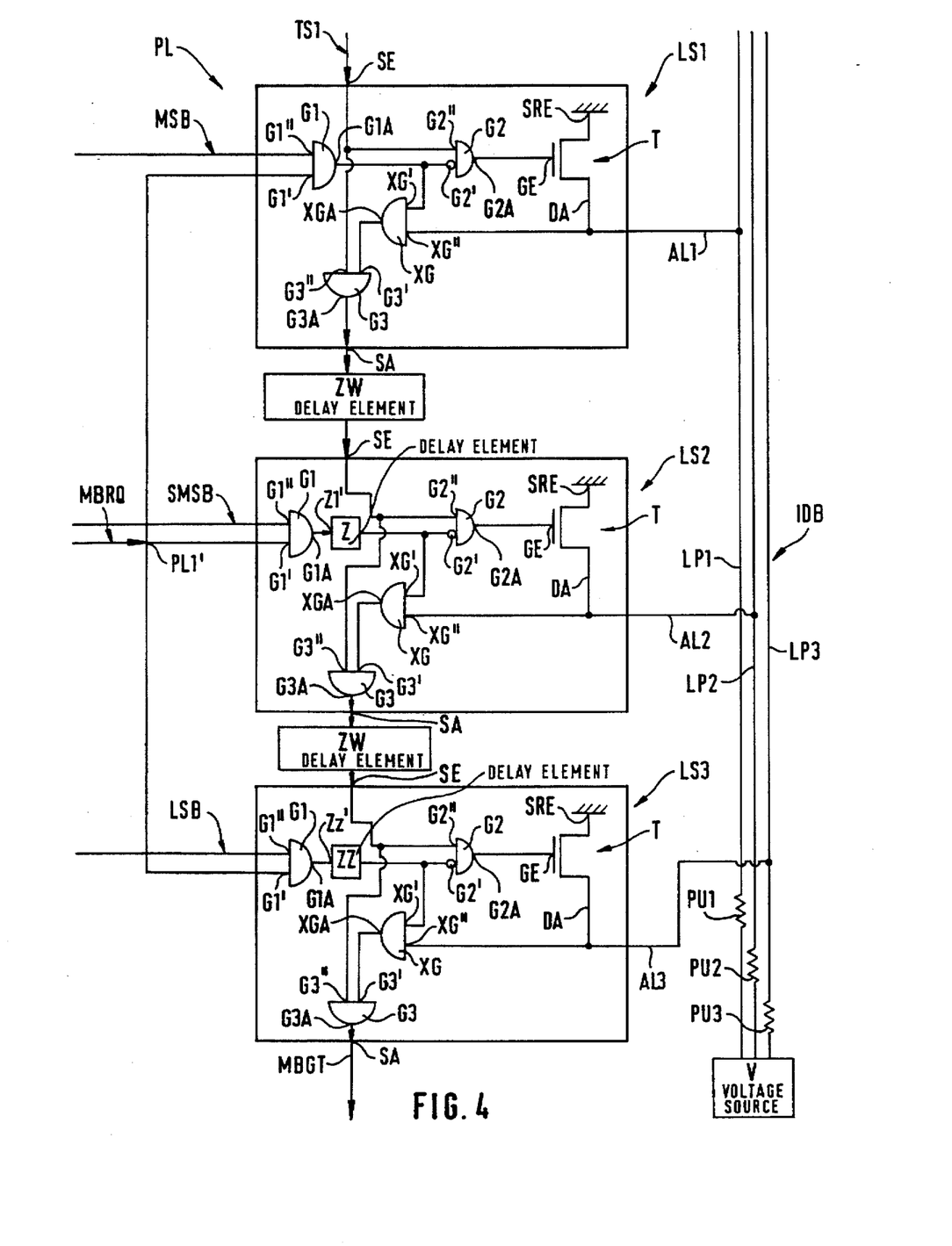
FIG. 4 is a schematic for a prioritization logic utilized in a bus arbiter in accordance with the present invention.

Each bus arbiter BA of the multimaster system includes a prioritization logic circuit PL. The previously described signal processing operations utilized in bus arbitration are controlled by the prioritization logic circuit PL. FIG. 4 depicts a schematic for the prioritization circuit PL utilized to process a 3-bit identification word IDW described in the preferred embodiment. It is understood that the prioritization logic circuit PL can be modified so as to process an identification word having a plurality of bits.

The previously described bus request signed MBRQ generated by the master M is applied to an input PLI' of the prioritization logic PL. Connected to this input are substantially similar first LS1, second LS2 and third LS3 logic circuits. The first logic circuit LS1 includes a first AND gate G1 whose first input G1' is provided with the bus request signal MBRQ applied at the input PL1'. A second input G1" of the first AND gate G1 is provided with the most significant bit MSB of the identification word IDW. An output G1A of the first AND gate G1 is connected to an inverting first input G2' of a second AND gate G2 and to a first input XG' of an EXNOR gate XG. A first control signal TS1 is applied to a control input SE of the first logic circuit LS1. The first control signal TS1 is then provided to a second input G2" of the second AND gate G2. The signal formed at an output G2A of the second AND gate G2 is applied to a gate input GE of a field-effect transistor T, whose source terminal SRE is grounded. A drain terminal DA of the field-effect transistor T is connected by a first arbiter line AL1 of the bidirectional bus arbiter connection BAA (not shown) to the first logic line LP1 of the identification bus IDB. This first logic line LP1 is connected through an external first load resistor PU1 to an external voltage source V. The pull-up function of the external load resistor PU1 may also be implemented passively by means of a depletion load or actively by dynamic pull-up of the voltage level of the logic line LP1 during one-half period of the system clock of the multimaster system. A second input XG" of EXNOR gate XG is connected to the first logic line LP1. An output XGA of the EXNOR gate XG is connected to a first input G3' of a third AND gate G3, whose second input G3" is supplied with the first control signal TS 1 applied at the control input SE of the logic circuit LS1. An output G3A of the third AND gate G3 is connected to a control output SA of the logic circuit LS1.

Essentially, the second LS2 and third LS3 logic circuits differ from the first logic circuit LS1 in the following respects. The second input G1" of the first AND gate G1 in the second logic circuit LS2 is provided with the next most significant bit SMSB of the identification word IDW, and the second input G1" of the first AND gate G1 in the third logic circuit LS3 is provided with the least significant bit LSB of the identification word IDW. Between the output G1A of the first AND gate G1 and the first input G2' of the second AND gate G2, a delay element Z, ZZ is inserted which delays the signal applied at its input Z1', Zz' by one period (logic circuit LS2) or two periods (logic circuit LS3) of the system clock controlling the signal processing of the multimaster system. The drain terminals DA of the field-effect transistors T in the second LS2 and third LS3 logic circuits are connected, respectively, to the second LP2 and third LP3 logic lines of the identification bus IDB via second AL2 and third AL3 arbiter lines. The second AL2 and third AL3 arbiter lines are connected to the external voltage source V through second PU2 and third PU3 load resistors, respectively.

The control input SE of the first logic circuit LS1 is provided with the first control signal TS1 which is constantly at logic "1". It is also possible to apply to the control input SE an external control signal such as a chip-select signal which triggers the first logic circuit LS1. Delay element ZW is connected between the control output SA of the first logic circuit LS1 and the control input SE of the second logic circuit LS2. An additional delay element ZW is connected between the control output SA of the second logic circuit LS2 and the control input SE of the third logic circuit LS3. The additional delay elements ZW delay the second TS2 and third TS3 control signals (not shown) such that control signal TS2 appears at the control input SE of the second logic circuit LS2 at the end of the first system clock period ST1. The third control signal TS3 is delayed such that it appears at the control input SE of the third logic circuit LS3 at the end of the second system clock period ST2. The control output SA of the third logic circuit LS3, which provides the grant signal MBGT, is coupled to an associated input of the master M.

The prioritization logic PL may now be generalized for the case of a k-bit identification word IDW. In Such a situation, the prioritization logic PL contains k parallel logic circuits LS1–LSk. The second input G1' of the first AND gate G1 of the first (second, . . . , kth) logic circuit LS1 (LS2–LSk) is supplied with the most significant (next most significant, . . . , least significant) bit MSB (SMSB, . . . , LSB) of the identification word IDW. The delay line Z following the output G1A of the first AND gate G1 in the second (third, fourth, etc.) logic circuit LS2 (LS3–LSk) introduces a delay of one (two, three, . . . , k-1) system clock periods. The drain terminal DA of the field-effect transistor T of the first (second, third, etc.) logic circuit LS1 (LS2–LSk) is connected via a first (second, third, etc.) arbiter line AL1 (AL2–ALk) to the first (second, third, . . . , kth) logic line LP1 (LP2–LPk) of the identification bus IDB. The additional delay element ZW is inserted between the control outputs SA and the control inputs SE of the respective subsequent logic circuits. The control output SA of the logic circuit LSK is connected to the associated master M.

The previously described prioritization logic PL is applicable for a bus arbitration technique in which the logic 0 prevails over the logic 1 on the logic lines LP1–LPk of the identification bus IDB. However, it is understood that the prioritization logic PL can be modified such that the logic 1 prevails over the logic 0. One method of modifying the prioritization logic in this manner includes replacing the noninverting output G2A of the second AND gate G2 in each logic circuit LS with an inverting output.

Furthermore, it is understood that the prioritization logic PL may be used in conjunction with arbitration techniques wherein the bus grant cycles are not generally performed simultaneously. Such an arbitration technique was described in the first embodiment of the present invention. In such a configuration, all arbiter lines AL1–ALk of the bus arbiter connection BAA are connected to a single logic line, such as logic line LP1 of the identification bus IDB.

The operation of the prioritization logic PL will now be described in reference to the bus arbitration previously described in FIG. 3 that occurs during the first bus grant cycle BZ1. In this situation, the bus arbiters BA1, BA2, BA3 and BA4 have corresponding first PL1, second PL2, third PL3 and fourth PL4 prioritization logics. In the first system clock period ST1, a logic signal of 1, 1, 0, 1 appears at the gate terminal GE of the field effect transistor T of the first logic circuit LS1 of each of the first PL1, second PL2, third PL3 and fourth PL4 prioritization logics. As a result of the open drain behavior of the drain terminal DA of the field effect transistors T, a logic level of 0 is formed on the first logic line LP1. This is read back via the first arbiter lines AL1 of the bidirectional bus arbiter connections BAA1, BAA2, BAA3 and BAA4 (see FIG. 1) of the first PL1, second PL2, third PL3 and fourth PL4 prioritization logics. The logic level is then applied to the second input terminal XG" of the EXNOR gate XG, which compares the logic level of the first logic line LP1 and the respective most significant bits MSB1, MSB2, MSB3 and MSB4. Since the logic level corresponds to the most significant bits MSB1, MSB2 and MSB4 (see FIG. 3), the output XGA of the respective EXNOR gate XG provides the second control signal TS2 in the form of a logic 1. At the control output SA of the first logic circuit LS1 of the third prioritization PL3, the logic level of the first logic line LP1 does not correspond with the most significant bit MSB3. Therefore, the control signal TS2 is provided in the form of a logic 0.

In the second system clock period ST2, the next most significant bits SMSB1, SMSB2, SMSB3 and SMSB4 are applied to the second inputs G1" of the first AND gates G1 of the second logic circuits LS2 of the first PL1, second PL2, third PL3 and fourth PLA prioritization logics. The signal processing that occurs in the second logic circuits LS2 of the first PL1, second PL2 and fourth PLA prioritization logics is understood by one of ordinary skill in the art and need not be described here.

In the second logic circuit LS2 of the prioritization logic PL3 of the third bus arbiter BA3, which drops out of the bus arbitration of the first bus grant cycle BZ1 in the first prioritization step, the following signal-processing operations are performed. The first input G2' of the second AND gate G2 is supplied with the second control signal TS2, whose binary value "0" indicates that the bus arbiter BA3 has already dropped out of the bus arbitration. The second control signal TS2 causes a logic 0 to appear at the output G2A of the second AND gate G2 of the second logic circuit LS2 regardless of the value of the next most significant bit SMSB2. Therefore, the field-effect transistor T of the second logic circuit LS2 is not turned on by the output signal from the second AND gate G2, which is applied to its gate terminal GE, so that the bit SMSB3 cannot influence the logic level on the second logic line LP2. The bus arbiter BA3 has thus been eliminated from the bus arbitration.

Figure 5:
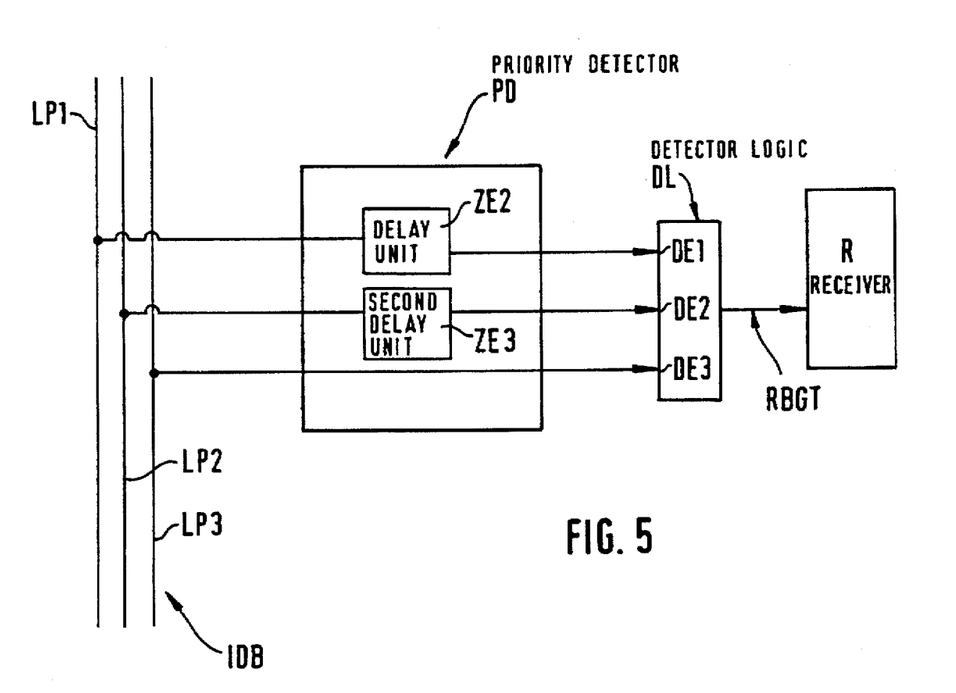
FIG. 5 is a schematic for a priority detector.

FIG. 5 shows a priority detector PD which detects the 3 bit identification word IDW of the prioritized master M that is transmitted on the identification bus IDB. The priority detector PD converts the identification word IDW of the prioritized master M, transmitted bit by bit in three successive system clock periods ST1, ST2 and ST3, to parallel form and evaluates it in a detector logic DL. The serial-to-parallel conversion of the three bits MSB, SMSB, and LSB of the identification word IDW is performed using a first ZE2 and a second ZE3 delay unit. The first delay unit ZE2, which is connected to the first logic line LP1, provides a delay equal to two system clock periods. The second delay unit ZE3, which is connected to the second logic line LP2, provides a delay equal to one period of the system clock. The least significant bit LSB of the identification word is transferred undelayed. As a result, the three bits of the identification word IDW appear in parallel form at the inputs DE1, DE2 and DE3 of the detector logic DL after every three periods of the system clock. In case of correspondence between the identification word IDW transmitted on the identification bus IDB and the identification stored in the detector logic DL, the detector logic DL generates a receiver grant signal RBGT which causes the receiver R associated with the priority detector PD to access the data placed on the data bus DB by the prioritized master M.

The priority detector PD can now be generalized for the case of a k bit identification word IDW. The detector logic DL of the priority detector PD has k-1 delay units ZE2–ZEk with different delays. The delays are such that the delay unit ZE1 assigned to the most significant bit MSB of the identification word IDW provides a delay equal to k-1 system clock periods. Moreover, the delay unit ZE2 assigned to the next most significant bit SMSB of the identification word IDW provides a delay equal to k-2 system clock periods. As is understood by one of ordinary skill in the art, the delays of subsequent delay units can be readily ascertained and need not be described here.

What is claimed is:

1. A bus arbitration apparatus for use in a video system comprising:

a data bus;

an identification bus, said identification bus including a plurality of logic lines;

a plurality of video sources, each of said video sources corresponding to a plurality of pixel signals representative of observer-visible pixels, each of said video sources having means for selecting a particular pixel signal from said plurality of pixel signals for transmission to said data bus, coupled to said data bus and each having a predetermined priority for accessing said data bus, said predetermined priority of each of said video sources determined in accordance with an identification word associated with each of said video sources and wherein each said identification word includes a plurality of bits;

means for forming a logic level on said identification bus by logically combining equally significant bits of each of said identification words;

means for performing a plurality of overlapping bus grant cycles, wherein each of said plurality of bus grant cycles determines priority among said plurality of said video sources by successively comparing, during a system clock time period, said equally significant bits of each of said identification words with said logic level on each of said logic lines on said identification bus, to eliminate each of said plurality of video sources having an associated identification word containing a bit that does not correspond to said logic level, wherein each of said successive comparisons occurs during each successive system clock time period, wherein each of said bus grant cycles includes multiple system clock time periods; and means for granting access to said data bus to one of said plurality of video sources that is not eliminated during each of said bus grant cycles.

2. The apparatus according to claim 1 wherein said plurality of overlapping bus grant cycles is operative to alternately compare said equally significant bits of said associated identification words of said plurality of bus grant cycles.

3. The apparatus according to claim 1 which further includes means for sequentially transmitting said equally significant bits of said associated identification word to identification bus during said plurality of bus grant cycles.

4. The apparatus according to claim 3, wherein said sequentially transmitting means transmits said equally significant bits in a descending sequence of significance.

5. The apparatus according to claim 1 wherein said logic level on said identification bus is formed by a logical AND function.

6. The apparatus according to claim 1, wherein said logic level on said identification bus is formed by a logical OR function.

7. The apparatus according to claim 1 wherein said priority determining means is a prioritization logic circuit which includes:

a plurality of parallel connected logic circuits, each of said logic circuits having an output, a control output and a control input;

a first delay element disposed between adjacent logic circuits, said first delay element coupled to said control outputs and said control inputs of said logic circuits;

said plurality of logic lines coupled between said outputs of said logic circuits and said identification bus;

bus request signal means for providing a bus request signal to each of said logic circuits;

identification word means for providing one bit of said associated identification words to each of said logic circuits; and control signal means for providing a control signal to said control input of said first logic circuit to cause said logic circuits to generate a bus request signal, wherein said bus request signal is provided by said output of said second logic circuit.

8. The prioritization logic circuit according to claim 7, wherein each logic circuit includes a first AND gate having a first input coupled to said bus request means, a second input coupled to said identification word means and an output, a second AND gate having an inverting first input connected to said output of said first AND gate, a second input connected to said control input and an output, a field effect transistor having a gate terminal connected to said out put of said second AND gate, a source terminal connected to ground and a drain terminal connected to said arbiter line, an EXNOR gate having a first input connected to said out put of said first AND gate, a second input connected to said identification bus and an output and a third AND gate having a first input connected to said output of said EXNOR gate, a second input connected to said control input and an output connected to said control output.

9. The prioritization logic circuit according to claim 8, wherein each of said logic circuits having said control input coupled to said first delay are controlled by a system clock and further include a second delay element, said second delay element connected between said output of said first AND gate and said inverting first input of said second AND gate to provide a delay of one clock period of said system clock.

10. The prioritization logic circuit according to claim 9, wherein said outputs of said second AND gate are inverting outputs.

11. The apparatus according to claim 1, further including a priority detector connected to said identification bus, a detector logic connected to said priority detector and a video receiver coupled to said detector logic whereby bits of said identification words in serial form are converted to parallel form and wherein said detector logic transmits said bits in parallel form corresponding to said identification word to said video receiver.

12. The apparatus according to claim 1, wherein said detector logic is controlled by a system clock and includes a plurality of parallel delay units to provide a delay difference between adjacent delay units of one clock period of said system clock.

13. A method of bus arbitration for a video system comprising the steps of:

assigning a predetermined priority for access to a data bus to a plurality of video sources, each of said video sources corresponding to a plurality of pixel signals representative of observer-visible pixels, each of said video sources having means for selecting a particular pixel signal from said plurality Of pixel signals for transmission to said data bus, coupled to said data bus, wherein said predetermined priority is determined by an identification word associated with each of said plurality of video sources and wherein each said identification word includes a plurality of bits;

forming a logic level on said identification bus by logically combining said equally significant hits of each said identification word;

determining priority among said plurality of video sources during a plurality of overlapping bus grant cycles, wherein each of said plurality of bus grant cycles are operative to successively compare, during a system clock time period, said equally significant bits of each said identification word with said logic level on said identification bus, to eliminate each of said plurality of video sources having an associated identification word containing a bit that does not correspond to said logic level wherein each of said successive comparison occurs during each successive system clock time period, wherein each of said bus grant cycles includes multiple system clock time periods; and granting access to said data bus to one of said plurality of video sources that is not eliminated during each said bus grant cycle.

14. The method according to claim 13 wherein said step of forming said logic level includes forming said logical level utilizing a logical AND function.

15. The method according to claim 13, wherein said step of forming said logic level includes forming said logic level utilizing a logical OR function.

16. A bus arbitration apparatus, comprising:

a data bus;

an identification bus;

a plurality of masters coupled to said data bus and each having a predetermined priority for accessing said data bus, said predetermined priority determined in accordance with an identification word associated with each of said plurality of masters and wherein each said identification word includes a plurality of bits;

means for forming a logic level on said identification bus by logically combining equally significant bits of each of said identification words;

means for determining priority among said plurality of maters during a bus grant cycle, wherein said bus grant cycle is operative to successively compare, during a system clock time period, said equally significant bits of each said identification word with said logic level on said identification bus, to eliminate each of said plurality of masters having an associated identification word containing a bit that does not correspond to said logic level wherein each of said successive comparisons occurs during each successive system clock time period, wherein each of said bus grant cycles includes multiple system clock time periods; and means for granting access to said data bus to one of said plurality of masters that is not eliminated during said bus grant cycle.

17. The apparatus according to claim 16, wherein said identification bus includes one logic line.

18. The apparatus according to claim 16, wherein said identification bus includes a plurality of logic lines corresponding to each of said equally significant bits.

19. The apparatus according to claim 18, which further includes means for sequentially transmitting said equally significant bits of said associated identification word to identification bus.

\* \* \* \* \*